Patented July 21, 1936

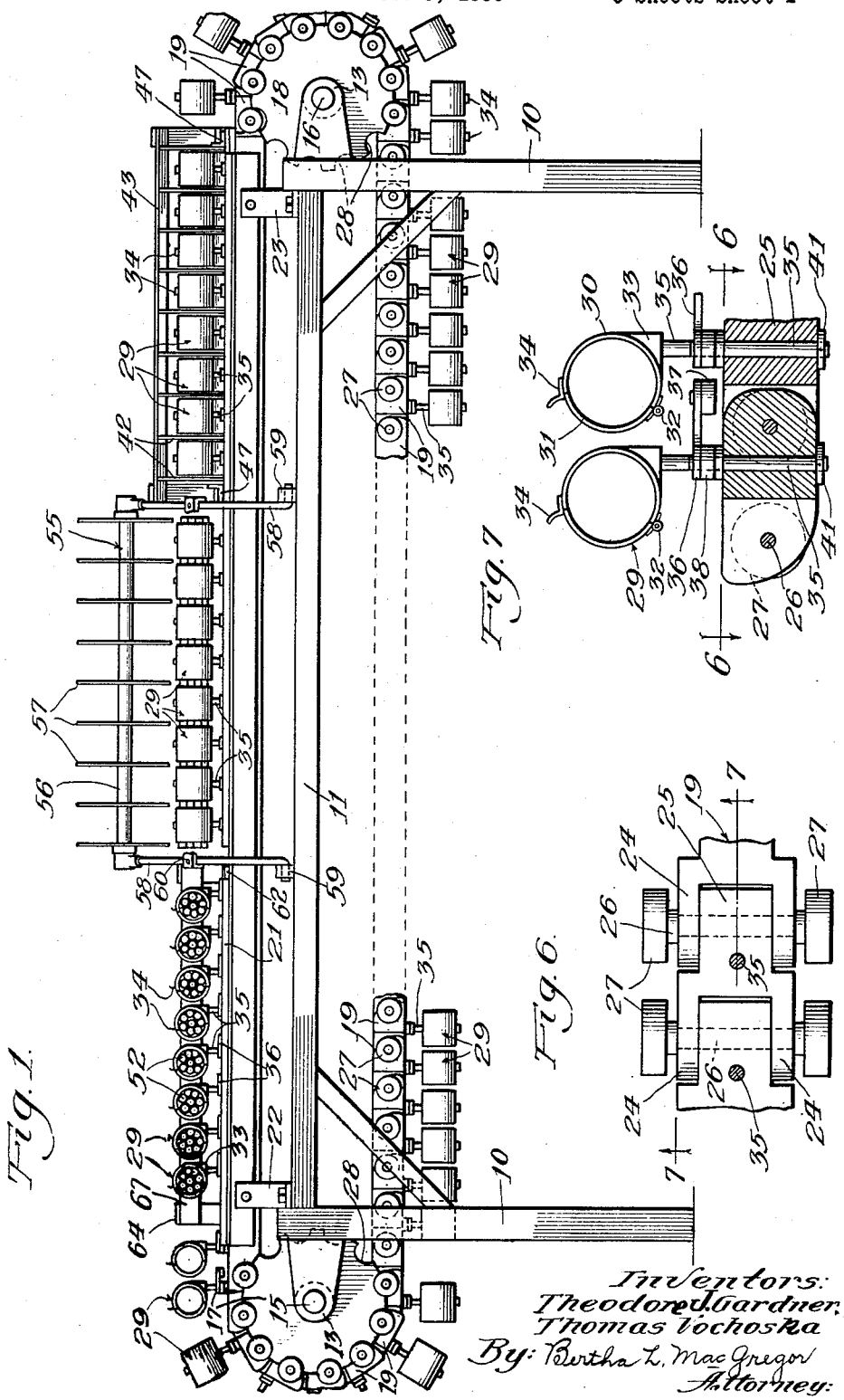

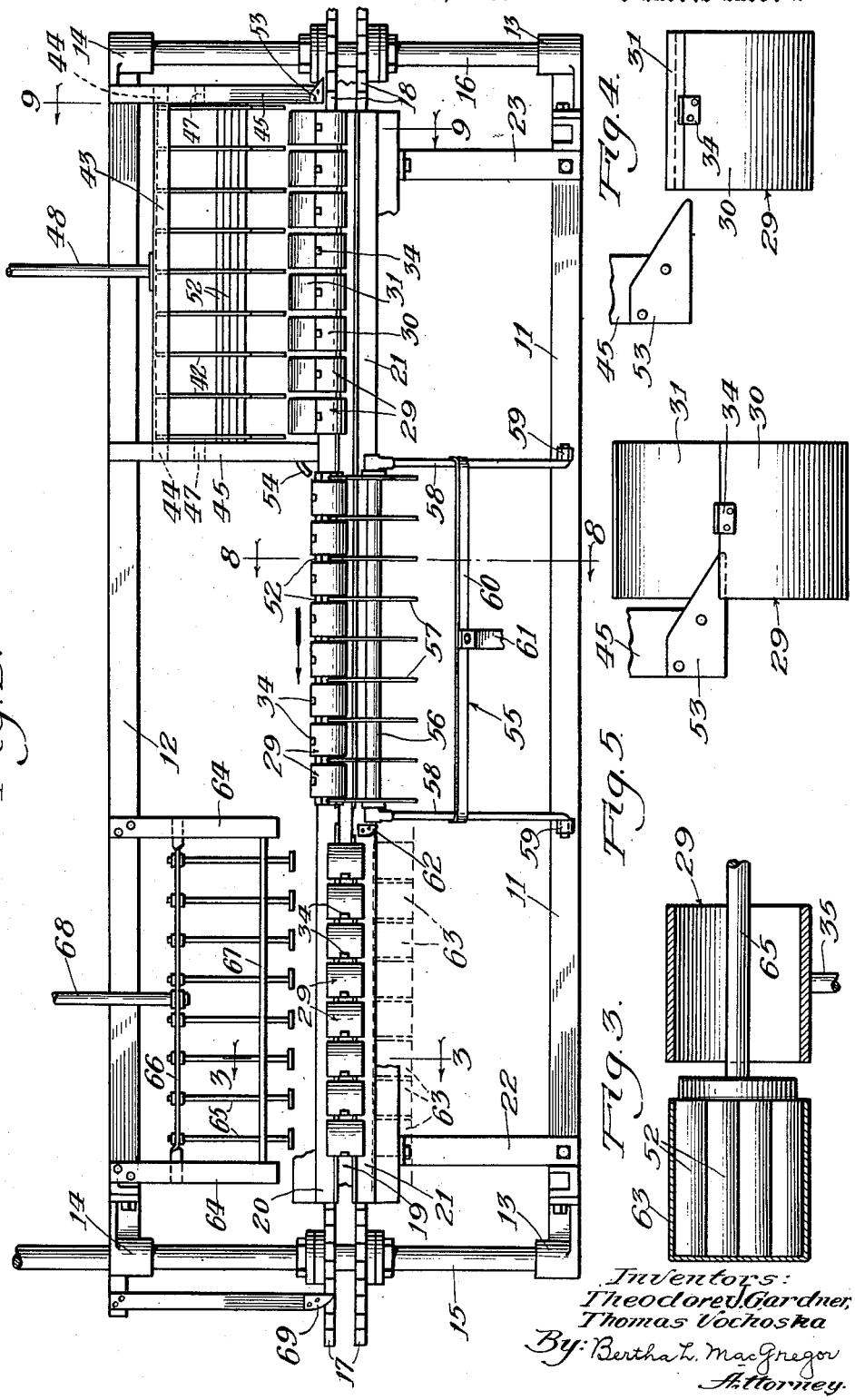

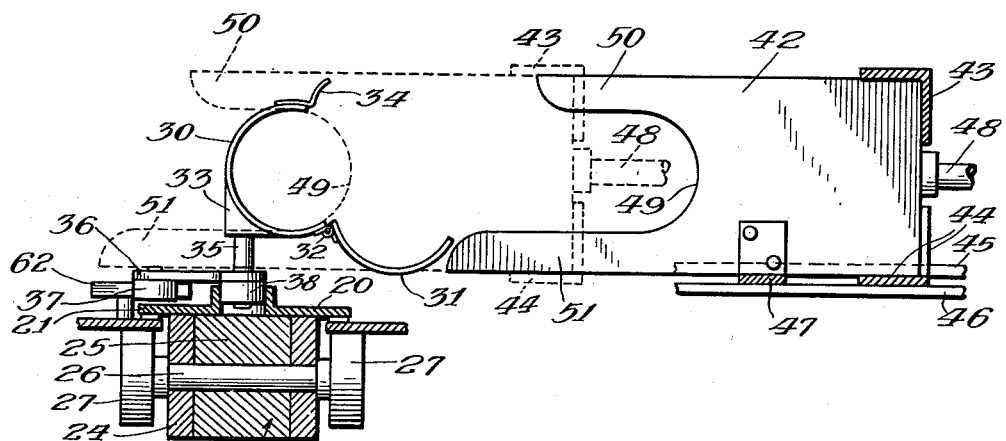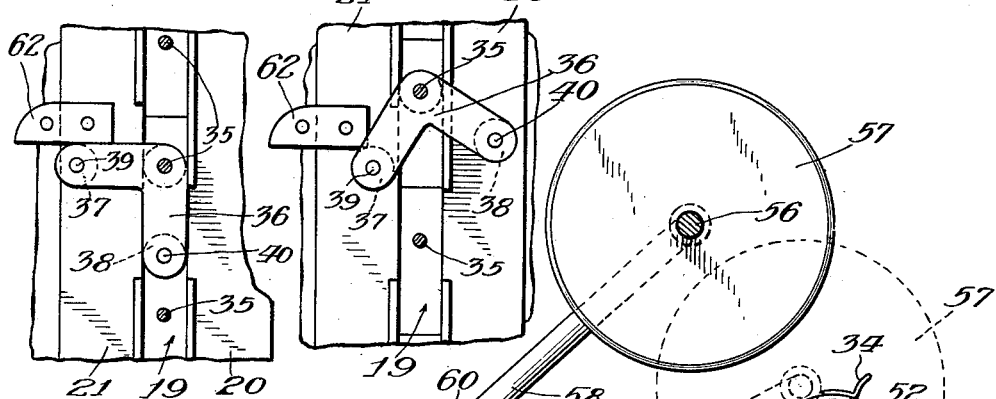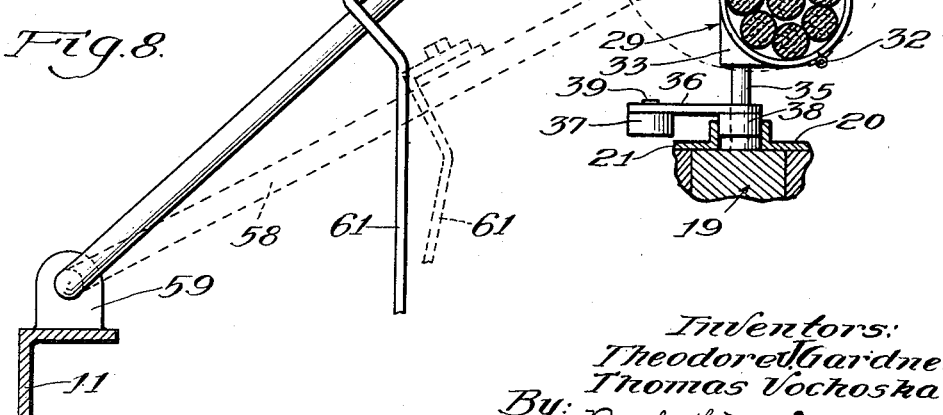

2,048,156

UNITED STATES PATENT OFFICE 2,048,156

CANNING MACHINE

Theodore John Gardner and Thomas Vochoska, Chicago, Ill., assignors of one-tenth to Bertha L. MacGregor, La Grange, Ill.

Application February 8, 1936, Serial No. 63,034

17 Claims. (Cl. 226—2)

This invention relates to canning machines, and particularly to a machine adapted for bunching, cutting and canning sausages. The machine is especially designed for the canning of sausages initially produced in lengths equal to or greater than the combined height of a plurality of the cans they are intended to occupy.

The main object of our invention is to produce a machine having means for automatically placing one or a plurality of lengths of material, such as sausages, into a plurality of axially aligned, open ended holders, moving said holders and contents simultaneously into juxtaposition to cutters adapted to cut the contents of the holders between the ends of said holders, moving said holders and contents into juxtaposition to plungers, and actuating said plungers to move the contents of the holders into cans located in alignment with the plungers.

Another object is to provide means for detachably and pivotally mounting the holders on an endless conveyor.

Another object is to provide means for preparing the holders for the reception of sausages or other suitable materials by actuating a hinged portion of the side wall of each holder to open position.

Another object of our invention is to provide means for bunching sausages and for placing the bunched sausages in holders.

Another object of our invention, in its preferred form, is to provide means for moving the holders from positions in which a plurality of holders are axially aligned, end to end, for filling and cutting purposes, to a position in which the holders are at right angles to said first position, for removal of their contents by plungers.

In the preferred form of construction, the invention is embodied in a machine for canning sausages of the "Vienna" type, of such diameter that a number of sausages, usually eight to ten, bunched together, occupy the space within the circumferential walls of a can, the initial length of each sausage in the bunch being equal to or greater than the combined height of a number of the cans they are to occupy. In the present embodiment it was assumed that the length of the bunched sausages equals the height of eight cans, or length of eight holders placed on their sides, end to end. Therefore, in the machine herein shown and described, eight holders are operated as a group, but obviously the number of holders in a group, and the size of the holders may be varied, and will depend on the character of the material to be canned and the sizes of the cans to be filled.

In the drawings:—

Fig. 1 is a front elevation of a machine for bunching, cutting and canning materials, embodying our invention.

Fig. 2 is a plan view of the same.

Fig. 3 is an enlarged, transverse vertical sectional view of a detail of construction, taken in the plane of the line 3—3 of Fig. 2, after the plungers have been actuated.

Fig. 4 is an enlarged plan view of one of a plurality of holders which are part of the machine, and of a cam for actuating the hinged wall of the holder to open position.

Fig. 5 is a plan view of the parts shown in Fig. 4 after the holder has been opened.

Fig. 6 is a sectional view taken in the plane of the line 6—6 of Fig. 7 showing the conveyor links in elevation.

Fig. 7 is a sectional view taken in the plane of the line 7—7 of Fig. 6 and showing holders positioned on conveyor links.

Fig. 8 is a transverse sectional view, partly in elevation, taken in the plane of the line 8—8 of Fig. 2, on an enlarged scale.

Fig. 9 is a transverse sectional view on an enlarged scale, taken in the plane of the line 9—9 of Fig. 2.

Fig. 10 is a plan view of the cam which turns the holders to a position at right angles to their previous positions.

Fig. 11 shows the parts illustrated in Fig. 10 but in a different position.

In that embodiment of our invention which we have chosen to illustrate in the drawings, the frame or support comprises legs 10, longitudinal bars 11 and 12, respectively, terminating in bearings 13, 14, in which are mounted rotatable shafts 15 and 16. One of these, the shaft 15, is a drive shaft, rotated by any suitable source of power, not shown. The shaft 15 has keyed to it a pair of associated sprocket wheels 17, 17, and mounted on the shaft 16 is a similar pair of sprocket wheels 18, 18, over which is trained an endless conveyor 19, to be described in detail hereinafter. The conveyor 19 travels in horizontal planes above and below the plane of the frame members 11, 12, and the upper lap of the conveyor is between and beneath spaced track members 20, 21 supported by brackets 22, 23 on the frame 11, 12.

The endless conveyor 19 comprises a plurality of links shown in plan in Fig. 6, each having spaced, apertured arms 24, 24 extending from a body 25 which is cut away at each side to reduce part of its width to the space between the arms 24. The reduced portion of the body 25 is bored to register with the apertures in the arms 24 of an adjacent link, and a shaft 26 extends through said body 25 of one link and arms 24, 24 of an adjacent link to pivotally connect the two links together. Rollers 27 are fixed on the ends of the shafts 26 and fit in the recesses 28 of the sprocket wheels 17 and 18.

Open ended cylindrical holders 29 are shown in detail in Figs. 7 and 9. Each holder is approximately as long as the height of one of the cans to be filled, and consists of two body portions 30, 31, hinged together at 32. The part 31 has a boss 33 on its lower side portion and a spring clip 34 on its upper edge. The boss 33 has fixed to it a shaft 35 which has fixedly connected to it a bell crank lever 36. At the ends of the arms of said lever 36, rollers 37 and 38 are rotatably mounted on pins 39 and 40, respectively, depending from said arms. The shaft 35 projects below the bell crank lever 36 which rests on top of the body 25 of a conveyor link 19, and said shaft 35 extends pivotally through the link 19 and is held in place by a nut 41. A holder 29 is thus pivotally mounted on each link of the conveyor 19, the pivotal mounting permitting the holders to be axially aligned, longitudinally of the conveyor 19, or axially parallel, transversely of the conveyor as will be hereinafter explained in the description of the operation of the machine.

Referring to the right hand side of Fig. 2 and the sectional view, Fig. 9, the means for bunching and filling the holders 29 comprises a plurality of vertically disposed plates 42 fixedly secured, in parallel relation, to angle bars 43 and 44 which extend across the ends of said plates 42. The ends of the horizontal portion of the bar 44 are extended to fit between upper and lower side bars 45, 46, supported above the frame 12 and by the track 20. A short brace 47 is secured to the outer surface of the plate 42 at each end of the group of plates 42 and said brace 47 also fits between said side bars 45 and 46. A reciprocable rod 48, connected to a source of power, not shown, and rigidly secured to said plate assembly, causes said assembly to slide back and forth, the supports 44 and 47 sliding between the side bars 45 and 46. The plates 42 are thin and so spaced as to be aligned with the spaces between the ends of the holders 29 as shown in Fig. 2. The plates 42 are cut away as indicated by the line 49 in Fig. 9, to form a short upper member 50 and longer lower member 51. A number of sausages 52, each as long as the combined length of eight holders 29, are shown in Fig. 2, as resting on the upper edges of the members 51 on the plates 42 and beneath said member 50, preparatory to being moved with the plate assembly toward the open holders 29. The dotted and full lines in Fig. 9 show the two extreme positions of the plate assembly for bunching the sausages and placing them in a plurality of holders 29.

That end of the right hand side bar 45 (Fig. 2) which is adjacent the conveyor 19 has a cam 53 secured to it in position to engage the end edge of the hinged member 31 of the holder 29 as the holder is carried to the cam by the conveyor 19. In Fig. 4 the holder is shown closed and about to be engaged by the cam 53, and in Fig. 5 the cam has disengaged the hinged body member 31 from the spring clip 34 and caused it to fall into open position, preparatory to receiving sausages 52. A cam 54 closes the holders 29 as the conveyor 19 carries them past said cam.

On the frame member 11 about midway between its ends, a cutter frame 55 is pivotally mounted. The frame comprises a shaft 56 carrying cutters 57, the shaft being mounted in one end of arms 58, 58. The other ends of the arms 58 are pivotally mounted in brackets 59 fixed to the frame bar 11. A brace bar 60 connects the arms 58, 58, and an operating lever 61, connected to said brace bar 60, is connected with a suitable source of power (not shown) for actuating the cutter frame and cutters 57 for the purpose hereinafter described. The cutters are positioned so as to be aligned with the spaces between the holders 29 on the conveyor 19.

To the left of the cutters, as viewed in Fig. 2, is a cam 62 fixed to the track 21 adjacent a place where the upright flanges of the tracks 21 and 20 are cut away as best shown in Figs. 10 and 11. The cam is located to contact with one arm of the bell crank lever 36 on the shaft 35 by which a holder 29 is pivotally mounted on the conveyor 19. In Fig. 10 the cam 62 is making contact with the approaching roller 37 on pin 39 of one arm of the lever 36 on a holder 29 carried by the conveyor 19, in which position the axis of the holder is longitudinally of the conveyor 19. In Fig. 11 the cam is causing the shaft 35 to turn 90° whereby the holders 29 will be disposed axially transverse to the conveyor 19, as shown in Fig. 2.

At the left hand side of Fig. 2 is shown the mechanism for moving the contents of the holders 29 into cans indicated at 63. The mechanism comprises slotted frame or side bars 64, rigidly secured to the frame 12. A plurality of plungers 65 are mounted in an bar 66 slidable in the slotted side bars 64. Between the plunger heads and said bar 66, the plunger rods 65 are slidably supported in a fixed bar 67 mounted in the side bars 64. An operating shaft 68, connected to the bar 66, is reciprocated by any suitable source of power, not shown, for the purpose of moving the plungers 65 transversely of the machine, through the holders 29, to force the contents of the holders into the cans 63, as shown in Fig. 3.

A cam 69 contacts the roller 38 on pin 40 of one arm of the lever 36 on the shaft 35 of the holder 29 as each holder is moved toward the left of Fig. 2, after having had its contents removed, to again turn the holders to the axially aligned, end to end arrangement.

The operation of that embodiment of our invention which we have shown in the drawings is as follows: Referring to Fig. 1, the empty holders 29, pivotally carried by the conveyor 19, are axially aligned as they approach the bunching and filling apparatus which in this construction is at the right hand side of Figs. 1 and 2. The drive, through shaft 15, is intermittent, and is governed by the character of the material to be canned. In the present case, having assumed the sausages 52 to be as long as the combined length of eight holders when positioned on the conveyor 19, the drive shaft 15 will be actuated intermittently so as to move the conveyor sufficiently to position eight empty holders, axially aligned, opposite the spaces between the plates 42, and then to hold them stationary until the holders have been filled.

As the empty holders 29 pass the cam 53, the hinged wall 31 of each holder is moved to open position, as shown in Figs. 2, 4, 5 and 9. The actuation of the shaft 48 then moves the plates 42, carrying the long sausages 52, toward the open holders, the plate arms 50 and 51 passing between the holders 29 and depositing the sausages in the group of holders opposite said lengths of sausages. The action is indicated by the full and dotted lines of Fig. 9.

Then the filled group of holders is moved by the conveyor toward the cutters 57, but before reaching said cutters the cam 54 engages the hinged wall member 31 of each holder, moving the same to closed position, with the clip 34 engaging the wall 31. The closed, filled holders of the group of eight (or other number) are moved to positions opposite the spaces between the cutters 57 and held temporarily stationary. The actuation of the lever 61 (Figs. 1, 2, and 8 moves the cutters 57 downwardly, the cutter frame 55 swinging on its pivotal connection in the brackets 59, causing the cutters to cut the sausages 52 or other material between the holders 29 of the group, and also to trim the ends of the sausages which may project beyond the end holders of the group.

The next actuation of the conveyor 19 moves the filled holders (with contents severed from the contents of the adjacent holder) past the cam 62. The cam causes the holder shaft 35 to be turned 90°, this action being accomplished by the contact of the cam 62 with the roller 37 on one arm of the bell crank lever 36 fixed on said shaft 35. The conveyor is actuated until the group of holders has been positioned as shown in Fig. 2, each holder axially parallel to the others of the group and disposed axially transversely of the conveyor, opposite a plunger 65, between said plunger and a can 63. The cans 63 may be conveyed to desired position by any suitable means. The actuation of the shaft 68, reciprocating the plungers 65, forces the material 52 out of the holders and into cans 63. The means for closing the cans is not a part of this invention and need not be described.

The emptied holders pass the cam 69 adjacent track 20, and the cam contacts the roller 38 on one arm of the bell crank lever 36, thus turning the holder shafts 35 another 90° to restore them to positions in which the holders are axially aligned, longitudinally of the conveyor 19, and ready to be opened and filled as hereinbefore described. Obviously the cam 69 may be positioned anywhere between the place where the contents of the holders are removed and the place where the holders are to be filled.

It will be understood, of course, that groups of holders may be used for the handling of lengths of material of a diameter equal to the diameter of each holder, and that single holders may be employed for conveying short lengths of material to the cans, but our machine is found most valuable for use in handling materials initially produced in lengths approximating the length of a plurality of holders and of smaller diameter than the diameter of each holder. It will also be understood that while we prefer to turn the holders from their positions longitudinally of the conveyor to positions transversely thereof, for removal of the contents by the plungers, such removal may be accomplished without turning the holders, by providing a second conveyor for moving the holders, as they leave the cutters, transversely of the machine into position to be operated upon by plungers having shafts extending longitudinally of the machine.

Changes may be made in details of construction without departing from the scope of our invention and we do not intend to be limited to the exact form shown and described, except as set forth in the appended claims.

We claim:—

1. In a machine for canning materials, the combination of an open ended holder, means for bunching and placing material in said holder, cutters spaced apart a distance equal to the length of the holder, means for actuating the cutters to cut the material protruding from the ends of the holder, and means for moving the material from the holder into a can, said means for bunching and placing the material in the holder comprising a reciprocable support having arms spaced apart the length of the holder and movable across the ends of the holder.

2. A machine for canning material initially longer than the combined height of a plurality of cans to be filled with said material, comprising a conveyor, a plurality of open ended holders carried by the conveyor, means for moving the material into a plurality of said holders, cutters spaced apart a distance equal to the length of each holder, means for actuating the cutters to sever the contents of the holders between said holders, and means for moving the material in each holder into a can.

3. A machine for canning material initially longer than the combined height of a plurality of cans to be filled with said material, comprising a conveyor, a plurality of open ended holders carried by the conveyor, a reciprocable support for the material, means for moving the material from the support simultaneously into a plurality of said holders, cutters spaced apart a distance equal to the length of each holder, means for actuating the cutters to sever the contents of the holders between said holders, and means for moving the material in each holder into a can.

4. A machine for canning material initially longer than the combined height of a plurality of cans to be filled with said material, comprising a conveyor, a plurality of open ended holders carried by the conveyor, means for moving the material into a plurality of said holders, cutters spaced apart a distance equal to the length of each holder, means for moving the conveyor and holders to position said group of filled holders in juxtaposition to the cutters, with each cutter opposite the space between the holder ends, means for actuating the cutters to sever the contents of the holders between said holders, and means for moving the material in each holder into a can.

5. A machine for canning material initially longer than the combined height of a plurality of cans to be filled with said material, comprising a conveyor, a plurality of open ended holders carried by and axially aligned longitudinally of the conveyor, means for moving the material into a plurality of said holders, cutters spaced apart a distance equal to the length of each holder, means for actuating the cutters to sever the contents of the holders between said holders, means for turning said holders to positions axially transversely of the conveyor, and means for moving the material in each holder into a can.

6. A machine for canning material initially longer than the combined height of a plurality of cans to be filled with said material, comprising a conveyor, a plurality of open ended holders carried by and axially aligned longitudinally of the conveyor, a reciprocable support for the material, means for moving the material from the support simultaneously into a plurality of said holders, cutters spaced apart a distance equal to the length of each holder, means for moving the conveyor and holders to position said group of filled holders in juxtaposition to the cutters, with each cutter opposite the space between the holder ends, means for actuating the cutters to sever the contents of the holders between said holders, means for turning said holders to positions axially transversely of the conveyor, and means for moving the material in each holder into a can.

7. A machine for canning material initially longer than the combined height of a plurality of cans to be filled with said material, comprising a conveyor, a plurality of open ended holders carried by the conveyor, means for moving the material into a plurality of said holders, cutters spaced apart a distance equal to the length of each holder, means for actuating the cutters to sever the contents of the holders between said holders, means for turning the holders 90°, and a plurality of plungers for simultaneously removing the material from a plurality of holders and forcing it into cans.

8. A machine for canning material initially longer than the combined height of a plurality of cans to be filled with said material, comprising a conveyor, a plurality of open ended holders carried by the conveyor, a reciprocable support for the material, means for moving the material from the support simultaneously into a plurality of said holders, cutters spaced apart a distance equal to the length of each holder, means for actuating the cutters to sever the contents of the holders between said holders, and means for moving the material in each holder into a can, said reciprocable support comprising a plurality of vertical plates having arms projecting toward the holders, registering with the spaces between the holders and movable across the ends of the holders to deposit the material supported on said arms into the plurality of axially aligned holders.

9. A machine for canning material initially longer than the combined height of a plurality of cans to be filled with said material, comprising a conveyor, a plurality of open ended holders carried by and axially aligned longitudinally of the conveyor, means for moving the material into a plurality of said holders, cutters spaced apart a distance equal to the length of each holder, means for actuating the cutters to sever the contents of the holders between said holders, means for turning said holders to positions axially transversely of the conveyor, and means for moving the material in each holder into a can, said means for turning the holders comprising a shaft on each holder pivotally mounted in the conveyor, an arm connected to the shaft and projecting from the shaft, and a cam in the path of travel of the conveyor adapted to engage said arm on the holder shaft to turn the same.

10. A machine for canning material initially longer than the combined height of a plurality of cans to be filled with said material, comprising a conveyor, a plurality of open ended holders carried by and axially aligned longitudinally of the conveyor, means for moving the material into a plurality of said holders, cutters spaced apart a distance equal to the length of each holder means for actuating the cutters to sever the contents of the holders between said holders, means for turning said holders to positions axially transversely of the conveyor, and means for moving the material in each holder into a can, said means for turning the holders comprising a shaft on each holder pivotally mounted in the conveyor, an arm connected to the shaft and projecting from the shaft, and a cam in the path of travel of the conveyor adapted to engage said arm on the holder shaft to turn the same and said means for moving the material into cans comprising a plurality of plungers for simultaneously removing the material from a plurality of holders and forcing it into cans.

11. A machine for bunching, cutting and canning sausages and the like, comprising a conveyor, a plurality of holders carried by the conveyor, a support for the sausages, means for moving the support and depositing the sausages in the holders, cutters for cutting the sausages to the length of each holder after said sausages have been deposited in the holders, means for actuating the cutters, means for turning the holders 90° after the cutters have been actuated, and means for forcing the sausages out of the holders and into cans.

12. A machine for bunching, cutting and canning sausages and the like, comprising a conveyor, a plurality of holders carried by the conveyor, each holder comprising an open ended cylinder having two body members hingedly connected together, means for moving one of the body members to open position, a support for the sausages, means for moving the support and depositing the sausages in the holders, means for closing the holders, cutters for cutting the sausages to the length of each holder after said sausages have been deposited in the holders, means for actuating the cutters, means for turning the holders 90° after the cutters have been actuated, and means for forcing the sausages out of the holders and into cans.

13. In a machine for canning sausages and the like, a plurality of open ended holders having means for opening one side, arranged in axial alignment, and a reciprocable support for carrying and depositing said sausages simultaneously in a plurality of said aligned holders.

14. In a machine for canning sausages and the like, a plurality of open ended holders having means for opening one side, arranged in axial alignment, a reciprocable support for carrying and depositing said sausages simultaneously in a plurality of said aligned holders, means for severing the contents of the holders between said holders, and means for moving said contents from each holder into a can.

15. In a machine for canning sausages and the like, a plurality of open ended holders having means for opening one side, arranged in axial alignment, a reciprocable support for carrying and depositing said sausages simultaneously in a plurality of said aligned holders, means for severing the contents of the holders between said holders, means for turning said holders 90°, and means for removing the contents.

16. The method of canning sausages and the like which comprises the steps of placing sausage, of a length exceeding the combined height of a plurality of cans to be filled, simultaneously into a plurality of axially aligned holders, cutting the sausage between the holders, and forcing the contents of each holder in an axial direction out of the holder and into a can.

17. The method of canning sausages and the like which comprises the steps of placing sausage, of a length exceeding the combined height of a plurality of cans to be filled, simultaneously into a plurality of axially aligned holders, cutting the sausage between the holders, turning the holders 90°, and simultaneously forcing the contents of the plurality of holders into an equal number of cans.

THEODORE JOHN GARDNER.
THOMAS VOCHOSKA.